United States Patent Office 3,371,870
Patented Mar. 5, 1968

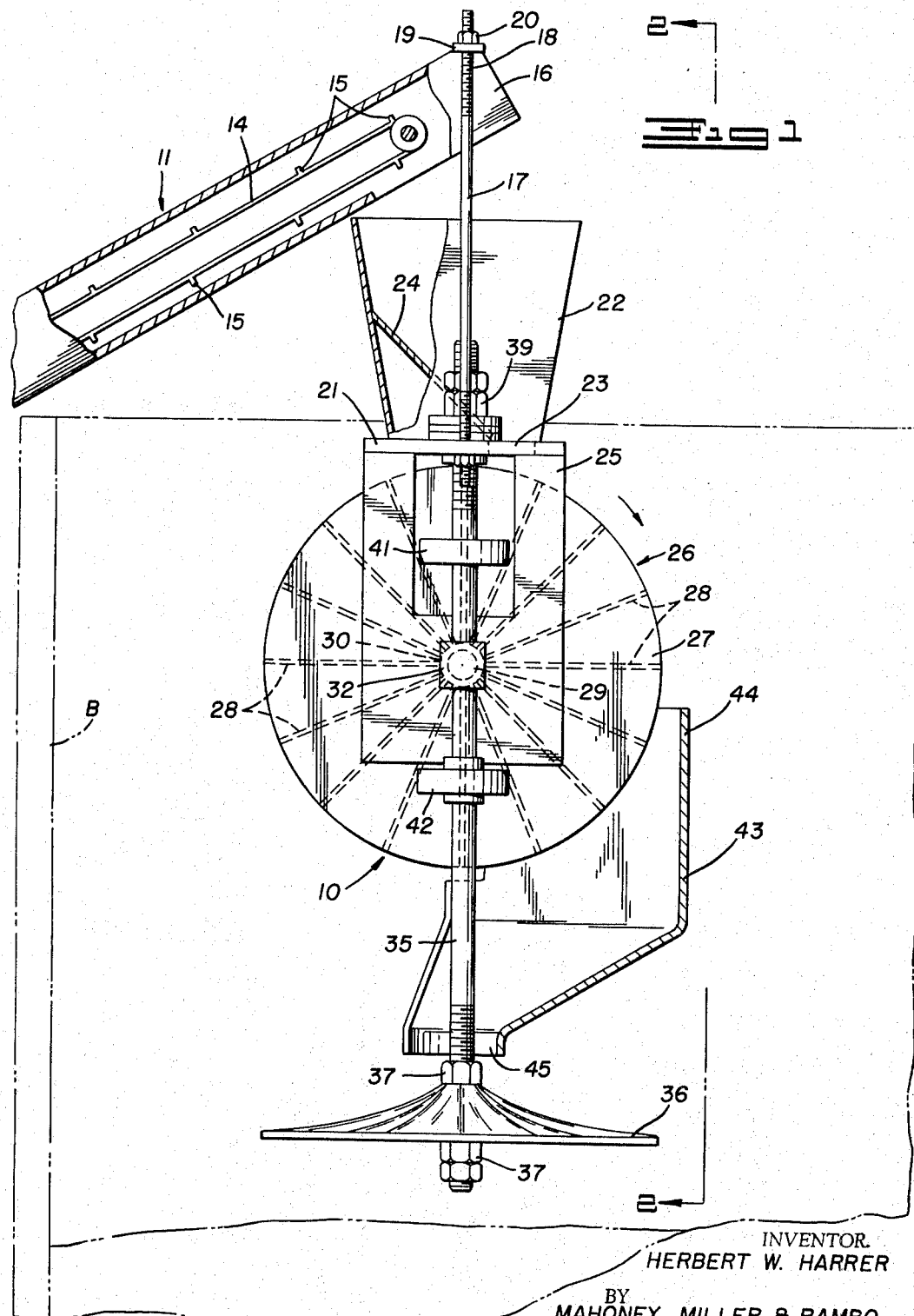

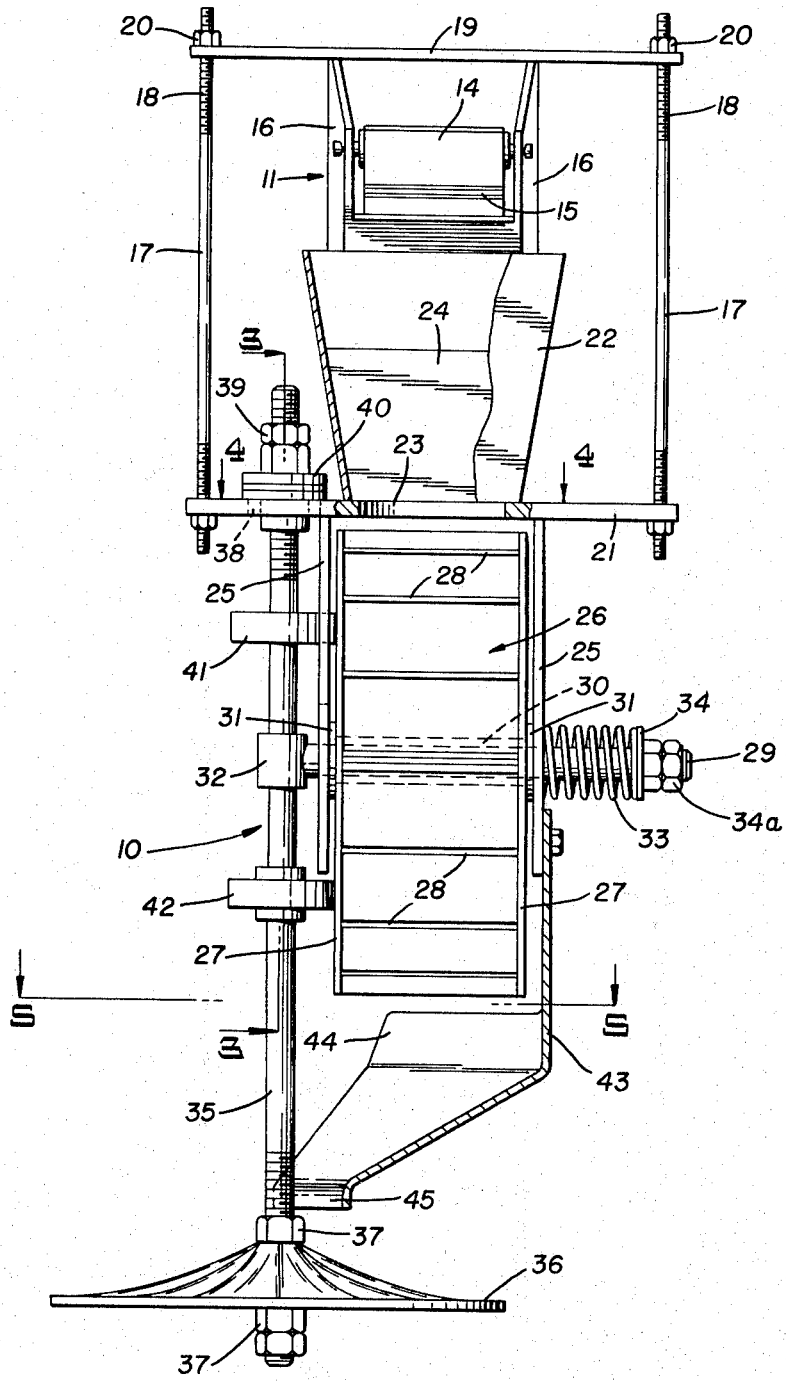

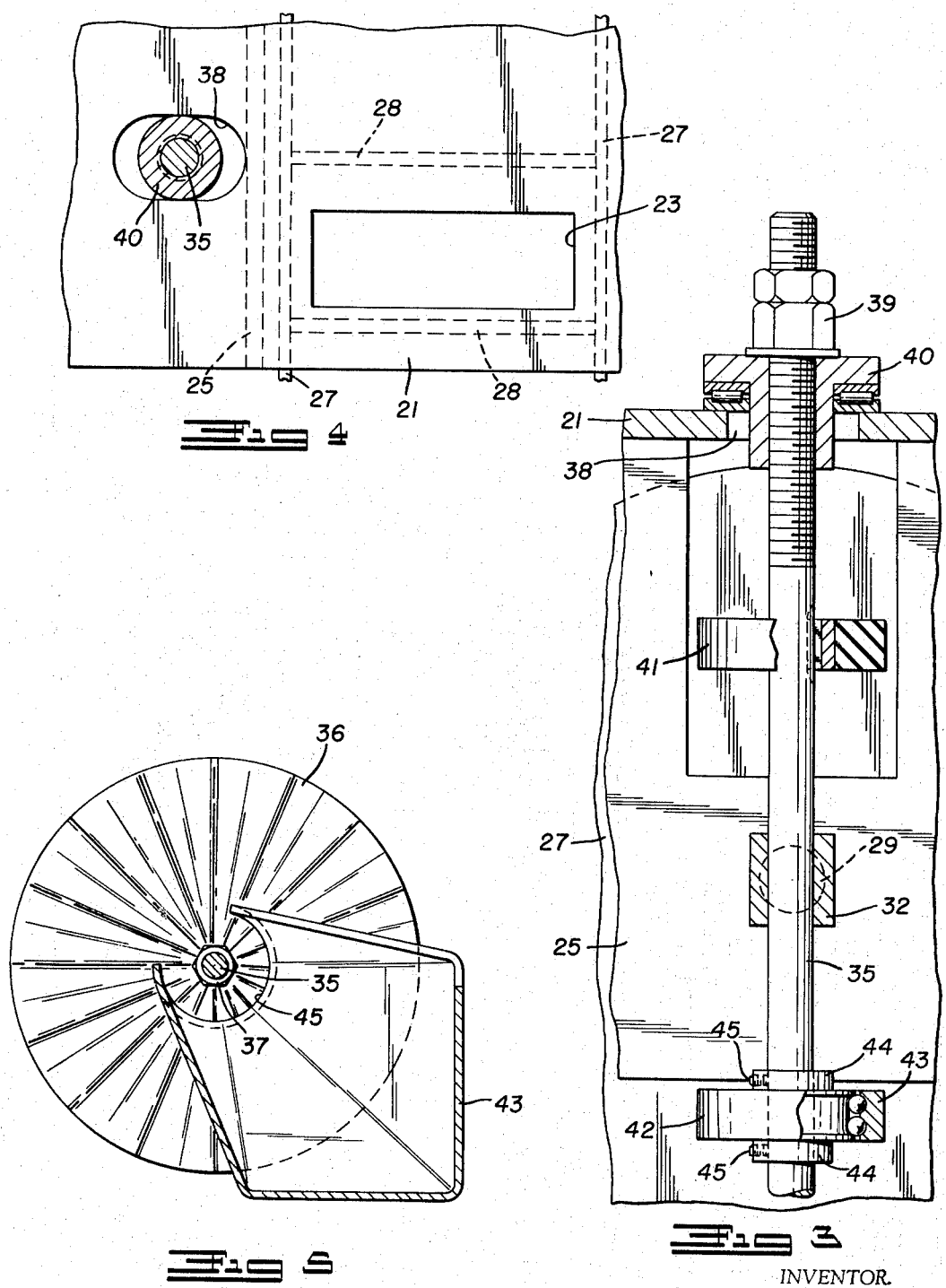

3,371,870
MATERIAL DISTRIBUTOR ATTACHMENT
Herbert W. Harrer, Rte. 1, New
Washington, Ohio 44854
Filed June 28, 1965, Ser. No. 467,550
6 Claims. (Cl. 239—684)

ABSTRACT OF THE DISCLOSURE

A distributor for particulate materials having a paddle wheel driven by the gravitational flow of materials from a hopper and a rotary, material spreader arranged to be driven by a friction drive operating off of the paddle wheel.

---

This invention relates to a material distributor attachment. It has to do, more particularly, with an attachment for receiving material in small particle form and distributing or scattering it over a relatively wide area. In the following disclosure the invention will be shown and described as a distributor attachment for grain loaders but it is to be understood that this is by way of example only and that the attachment can be used for other purposes and with other materials.

The distributor of this invention is of the general type which is known as a centrifugal scattering or broadcast spreader and which includes a substantially disk-like broadcasting or scattering distributor member that is rotatable about a vertical axis. With this type of distributor, means is provided for feeding the small-particle material onto the upper surface of the rotating distributor which will then scatter the material by means of centrifugal force through a relatively wide area about the axis of the distributor. One of the most important improvements of the present invention over prior art centrifugal distributors is the manner in which the centrifugal distributor member is driven. According to this invention, the weight of the material being fed to the centrifugal distributor is relied upon to drive the distributor. Therefore, it is not necessary to provide cumbersome and complicated driving means which is expensive initially to manufacture and install and subsequently to maintain as well as costly to operate in its power requirements. Various other improvements have been incorporated in this distributor attachment as will be evident from the following detailed description.

In the accompanying drawings, by way of example, the invention is shown incorporated in a grain loader used for loading a circular bin.

In these drawings:

FIGURE 1 is a view partly in side elevation and partly in vertical section showing the entire grain loader.

FIGURE 2 is a view partly in side elevation and partly in vertical section of the apparatus of FIGURE 1 taken from the position indicated at line 2—2 of FIGURE 1.

FIGURE 3 is an enlarged vertical sectional view taken along line 3—3 of FIGURE 2.

FIGURE 4 is an enlarged horizontal sectional view taken along line 4—4 of FIGURE 2.

FIGURE 5 is an enlarged horizontal sectional view taken along line 5—5 of FIGURE 2.

With specific reference to the drawings and especially to FIGURES 1 and 2, the distributor attachment is shown in position for distributing material, such as grain, in a circular bin B. The attachment of this invention is illustrated generally by the numeral 10 and is disposed concentrically within the upper end of the bin. The attachment receives the grain from a supplying means which is illustrated as an elevator 11 that has its upper or discharge end extending upwardly over the open upper end of the bin. The attachment of this invention may be used with other material-supplying means. The elevator 11 is shown in FIGURE 1 as comprising and endless driven belt 14 with spaced material-carrying transverse flights 15 thereon. The belt is suitably mounted on a supporting frame 16. In this instance, the distributor attachment 10 is suspended from the upper end of the frame 16.

The means for suspending the attachment 10 from the frame 16 is indicated in FIGURES 1 and 2 as comprising a pair of laterally spaced upright rods 17 which have threaded upper ends 18 passing through openings in the outer projecting ends of a laterally extending bar 19. By means of nuts 20 on the ends 18 of the rods, the rods may be vertically axially adjusted relative to the bar 19. The lower ends of the rods 17 are similarly connected to a main support plate 21 of the attachment 10 which is suspended in a horizontal but a vertically adjustable position by the rods 17. Positioned on the upper side of the plate 21 is an upright receiver or hopper 22 which has an upwardly opening mouth or inlet for receiving material discharged from the upper end of the elevator 11. This hopper 22 preferably is of rectangular or square cross section and has side walls which converge inwardly toward the bottom of the hopper which is formed by the plate 21. Offset to one side in the bottom of the hopper is a discharge outlet 23 which is in the form of a slot extending transversely relative to the supply elevator 11. To aid in directing the material, discharged by the elevator into the hopper, toward this slot, a baffle 24 may be provided and this baffle extends downwardly and inwardly from one wall of the hopper, which may be considered the rear wall, almost to the slot 23 which is adjacent the other wall of the hopper and which may be considered the forward wall. The support plate 21 is provided with two laterally spaced depending, vertically disposed plates or support brackets 25, which are disposed laterally outwardly beyond the ends of the slot 23, as indicated in FIGURE 2.

A material-receiving wheel 26, substantially in the form of a paddle wheel, is journaled on a horizontal axis between the plates 25, as shown best in FIGURES 1 and 2. This wheel is shown as being formed of two axially spaced discs 27, which have the radially extending vanes or plates 28 secured therebetween in angularly spaced relationship. These plates provide partitions which form V-shaped or pie-shaped pockets or compartments that are closed at the center ot the wheel but open outwardly at the periphery or circumference thereof. The wheel is mounted on a shaft 29 which is supported by the plates 25 at a distance below the main support plate 21 which is slightly more than the radius of the wheel. As the wheel 26 rotates, the outer open ends of the wheel pockets are presented successively below the discharge outlet slot 23 of the hopper 22 so that material is supplied in the pockets. Since the slot 23 is offset laterally relative to the axis of the paddle-wheel shaft 29, rotation of the wheel will result due to the gravity effect produced by the material entering downwardly through the slot 23 into the successive off-center wheel pockets.

The wheel 26 has a central hub or sleeve 30, to which the inner ends of the plates 27 are secured, through which the mounting shaft 29 axially extends. The hub of the wheel is splined on the shaft and the shaft is free to move axially relative to the hub. The shaft 30 is mounted for axial movement in the bearings and spacers 31 provided at the sides of the wheel between the wheel and the associated plates 25 and carried by such plates, the shaft extending outwardly through these bearings and aligning openings in the plates 25. One end of the shaft 29, for example, the lefthand end as shown in FIGURE 2, is provided with a shaft bearing 32 with its axis extending vertically at a right angle to the axis of the shaft 29. The opposite end of the shaft carries a biasing arrangement which tends to move the shaft 29 axially to the right. This arrangement comprises a compression spring 33 which engages the associated plate 25 at its inner end and a washer 34 at its outer end, with the washer being held in adjusted axial position on the shaft by means of the nut and lock nuts 34a. The spring 33 being under adjustable compression will tend to push against the washer 34 and move the shaft 29 axially to the right relative to the plates 25 and the wheel 26 disposed axially between those plates.

The biasing arrangement for the shaft 29 controls the lateral position of the vertical axis of the shaft bearing 32 and the shaft 35 which extends vertically therethrough. This shaft 35 is the drive and supporting shaft for the centrifugal spreader or distributor 36 which is nonrotatably mounted on the lower end thereof at a level substantially below the circumference or periphery of the paddle wheel 26. The member 36 is axially adjustably positioned on the threaded lower end of the shaft 35 by means of the upper and lower nuts 37 between which it is axially clamped.

The shaft 32 is suspended for axial adjustment in the bearing 32 from the main support plate 21. The threaded upper end of the shaft 35 extends upwardly through a lateral slot 38, shown in FIGURES 2, 3 and 4, that extends outwardly relative to the adjacent depending support plate 25. Nuts 39 threaded on the upper end of the shaft 35 clamp stop washers 40 in axially or vertically adjusted position on the shaft and these washers are of sufficient diameter that they will not pass downwardly through the slot 38 which is of less width than the diameter of the washers.

Above the axis of the shaft 29, the shaft 35 has a driving roller 41 keyed thereon at a fixed axial position and below the axis of the shaft 29, the shaft 35 has an idler roller 42 thereon at a fixed axial position. The roller 41 engages the surface of the adjacent wheel disc 27 through a large vertical slot in the adjacent plate 25 whereas the roller 42 is below the lower extremity of the plate 25 and engages the plate 27. The roller 42 includes the outer roll 43 of a ball bearing which engages the plate 27 and is held in vertically or axially selected position by the stop collars 44 and associated setscrews 45. It will be apparent that vertical or axial adjustment of the drive shaft 35 can be made by means of the nuts 39 and this will move the drive roller 47 radially relative to the axis of the shaft 29 so as to drive the vertical shaft 35 from the paddle-wheel shaft 29 at a selected speed. The shaft 35 is pulled laterally by the axial pull of the spring 33 on the shaft 29 so that the rollers 41 and 42 will engage the paddle wheel and the roller 41 will provide a friction drive from the paddle wheel to the shaft 35. The suspended shaft 35 will move laterally as necessary because of the provision of the slot 38. The race 43 of the idler 42 will rotate in a direction opposite to that of the shaft driving roller 41 and its variable radial position relative to the axis of the paddle-wheel shaft 29 will not affect the drive to the shaft 35 since it is merely an idler.

The material dropping into the successive off-center pockets of the paddle wheel 26 will drive the wheel by means of a gravity force and will drive the shaft 29 due to the spline connection therewith. This, in turn, will drive the centrifugal spreader 36 about the vertical axis of the shaft 35. As the pockets of the paddle wheel 26 travel downwardly, the material will be successively discharged therefrom. To direct this material onto the distributor or spreader 36, a material deflector 43 is provided beneath and at the same side of the shaft 35 where the offset hopper outlet opening 23 is located. The shape of this deflector is indicated best in FIGURES 1, 2 and 5 and it comprises an upper wide-receiving or inlet portion 44 which closely surrounds a lower quadrant of the wheel 26 and a lower outlet throat portion 45 which is concentric with the shaft axis 35 and has a lower extremity terminating just above the spreader 36. The center of the member 36 is raised and flares outwardly and downwardly to its outer peripheral or circumferential edge. Thus, the material discharged onto the member 36 will be directed radially outwardly thereof by gravity as well as centrifugal force. The vertical position of the extremity of the outlet portion 45 relative to the upper surface of the member 36 may be accurately set by means of the nuts 37.

In the operation of the entire distributor attachment 10, it will be properly located at the desired level relative to the upper end of the circular bin B and substantially at the vertical axis thereof. If the elevator 11 is now actuated to deposit material in the hopper 22, the centrifugal distributor or spreader 36 will be driven by the weight of the material discharged through the opening 23 in the bottom of the hopper. The weight of this material deposited in the successively presented pockets of the paddle wheel will rotate the wheel and will, in turn, drive the centrifugal spreader 36. Eventually, the material which has driven the wheel and spreader will be deposited on the spreader and will be evenly distributed or scattered about the axis thereof in the bin B.

It will be apparent that this invention provides a centrifugal spreader which is driven by the gravity effect of the material supplied thereto. Therefore, no complicated driving mechanism is required and no power source other than the gravity effect of the material to be spread, as it is supplied thereto, is necessary. The device is readily adjustable in various respects to make it suitable for various materials.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A distributor for particulate materials comprising a material-receiving hopper having an outlet for the gravitational flow of materials therefrom; a rotary paddle wheel positioned below the outlet of said hopper and arranged for rotation about a substantially horizontal axis, said wheel including disc-like side plates and a plurality of angularly spaced, radially extending vanes defining a plurality of material-receiving pockets opening radially outwardly from said wheel, the outlet of said hopper extending across said wheel and being arranged in laterally offset relation to a vertical plane passing through the axis of rotation of said wheel, a rotary spreader member positioned below said paddle wheel to receive and broadcast materials discharged from the pockets of said paddle wheel upon downward rotation thereof, said spreader member being mounted on a substantially vertical drive shaft extending upwardly along one side of said paddle wheel in perpendicular relation to the axis of rotation of said paddle wheel; and a driving connection between said paddle wheel and said shaft including a driving roller carried by said shaft and disposed in frictional engagement with a side plate of said paddle wheel, and biasing means for yieldably engaging said roller with said side plate.

2. A distributor according to claim 1 in which said biasing means comprises a spring engaging the opposed disc plate of said wheel, said wheel being splined on a shaft at said horizontal axis for relative axial movement, said shaft carrying said spring at one end and carrying a bearing sleeve at its opposed end for said vertical shaft.

3. A distributor according to claim 2 in which said vertical shaft is suspended by a support which permits lateral movement of the vertical shaft relative to said wheel.

4. A distributor according to claim 3 in which said vertical shaft is axially adjustable in said bearing sleeve, said suspending means comprising a horizontal support having a lateral slot formed therein in which said vertical shaft is disposed, and an axially adjustable stop carried by said shaft above said slot.

5. A distributor according to claim 2 in which said spreader member has an upper surface which is higher at its center and flares outwardly and downwardly to the periphery of the spreader member.

6. A distributor according to claim 5 in which a deflector is provided which has an inlet portion that closely embraces the lower portion of the paddle wheel and has an outlet portion located above the center of said spreader member.

References Cited

UNITED STATES PATENTS

| 525,339 | 9/1894 | Ditto | 275—15 |
| 1,793,032 | 2/1931 | Welker | 214—17 |

FOREIGN PATENTS

| 19,225 | 4/1930 | Australia. |
| 40,553 | 7/1929 | Denmark. |

M. HENSON WOOD, JR., *Primary Examiner.*

ABRAHAM G. STONE, *Examiner.*

J. R. OAKS, *Assistant Examiner.*